UNITED STATES PATENT OFFICE.

JONAS W. AYLSWORTH, OF EAST ORANGE, NEW JERSEY, ASSIGNOR TO CONDENSITE COMPANY OF AMERICA, OF GLEN RIDGE, NEW JERSEY, A CORPORATION OF NEW JERSEY.

INSULATING COMPOSITION.

1,102,633. Specification of Letters Patent. Patented July 7, 1914.

No Drawing. Application filed January 2, 1912. Serial No. 668,941.

*To all whom it may concern:*

Be it known that I, JONAS W. AYLSWORTH, a citizen of the United States, and a resident of East Orange, in the county of Essex and State of New Jersey, have invented certain new and useful Improvements in Insulating Compositions, of which the following is a description.

My invention relates to a composition of matter which shall be valuable as a cement or sealing compound for electrical apparatus and also as an insulating impregnating compound for coils and the like.

Accordingly, my object is to produce such a composition having the valuable properties which will be hereinafter pointed out.

Referring more particularly to the composition when used as a sealing compound or cement for electrical apparatus, such as transformers, coils, conduits and other electrical appliances, it is particularly desirable that the composition should have a high flow point and congealing point so that the compound will not become dislodged when the apparatus sealed thereby becomes heated in use. It is also desirable that the composition should have high dielectric strength and good mechanical strength, strong adhesion to the object which it is desired to cement or seal and to be oil and water proof and non-corrosive. The composition should also be extremely fluid when molten so that it can readily be poured and flow into the spaces to be filled thereby when the apparatus is in place and so that it may be heavily loaded with filling materials when desired. It should also have only a small shrinkage when cooling and solidifying in position. The compositions described hereinafter fulfil these requirements to a marked degree. The great fluidity and other properties of the hereinafter described compositions, make them also especially valuable as impregnating compounds for coils. Some of the hereinafter described compositions also have the desirable property of being somewhat flexible when cold.

The composition comprises a fusible natural or synthetic gum, compounded with a non-volatile crystalloid substance of high melting point which shall have the property of giving the substance a more or less sharp setting point at a comparatively elevated temperature and the property of being thinly fluid when molten. Such gums referred to, are natural varnish gums, such as copal, shellac, Manila gum, and kauri or fusible synthetic gums such as phenol resins, which I may also class as varnish gums. Also preferably, an oily substance, such as castor oil, a fluid cresol, or mono-chloro-naphthalene, is included in the composition, this oil being added for the purpose of rendering the composition somewhat flexible when cold and less brittle than it would otherwise be. To the composition may be added various quantities of powdered or fibrous mineral fillers, such as asbestos powder, mica, infusorial earth, clay, zinc oxid or the like. The organic fillers, such as wood flour, may be used in some cases, but are not so desirable when the mass is a high melting point composition. The ingredients of the composition, other than the filler, apparently form a solidified solution intermixed with crystals of the crystalloid substance.

The gum or resin to be used should be proof against such hydro-carbon oils as are used for lubricating purposes and commonly as oil seals for electrical apparatus, and also should be fusible non-conducting substances. all those mentioned being of this class. All those mentioned, however, are very viscous when molten and none of them has a sharp setting point which makes them undesirable, alone, for the purposes of this invention. My invention consists chiefly in compounding with such a gum, an insulating substance having a high melting point and very slight solubility in hydro-carbon oils and insolubility in water, and which shall impart to the composition the desired fluidity when molten and a sharper congealing point. Comparatively few available substances have these desirable qualities. Those which I have found suitable are crystalloids, such as phthalimid, phenyl phthalimid, per-chloro-naphthalene, and tetra-chloro-phenylene-oxid. Phenyl phthalimid is the preferred substance having the desired characteristics. Phthalimid may be used but is not quite as desirable as phenyl phthalimid because it has a somewhat lower boiling point. A composition formed with phthalimid cannot be heated above 360° F. without considerable loss by vaporization. The composition containing phenyl phthalimid, however, may be heated to over 400° F. without much loss by vaporizing. Phenyl phthalimid

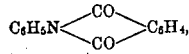

is a condensation product of anilin and phthalic anhydrid, and phthalimid,

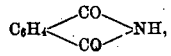

is a product formed by passing dry ammonia over heated phthalic anhydrid. Perchloro-naphthalene, $C_{10}Cl_8$, and tetra-chloro-phenylene-oxid, $C_6Cl_4O$, are known substances. When any of the gums or resins mentioned are melted with phenyl phthalimid, phthalimid or equivalent crystalloid, a solution is formed which is thinly fluid and which has a more or less sharp congealing point varying with the percentage of the crystalloid in the composition.

The composition in its least complex form, comprises approximately Manila gum or equivalent, 100 parts, and phenyl phthalimid 20 to 60 parts, with or without mineral fillers. Such a composition is proof against hydro-carbon oils, extremely fluid when molten and has a high congealing point which may be varied between 240° F. and 320° F. by varying the proportions of phenyl phthalimid.

Examples of other variations are as follows:—

100 parts of Manila gum or equivalent gum or resin, 10 to 30 parts castor oil or equivalent oil, 20 to 70 parts phenyl phthalimid or equivalent crsytalloid, 0 to 100 parts of mineral filler.

100 parts phenol resin, 10 to 30 parts cresol or mono-chloro-naphthalene, 20 to 70 parts phenyl phthalimid, 0 to 100 parts filler.

100 parts shellac, 20 to 60 parts phenyl phthalimid, 0 to 50 parts filler.

The phenol resin referred to is preferably a fusible soluble condensation product of a phenol and formaldehyde having no uncombined formaldehyde or other ingredient containing the methylene radical $CH_2$ therein. Such a phenol resin is described in my application Ser. No. 496,060, filed May 14, 1909, and in my Patent No. 1,029,737 dated June 18, 1912. As stated, the composition described may also with advantage be used as an impregnating compound for electrical coils. This is especially true when the composition is formed with copal or Manila gum. If phenol resin is used as the gum, in a composition intended for this purpose, the same should preferably be carefully dehydrated, and contain no free or uncombined phenol or only a very slight percentage of the same. A phenol resin, such as described, can be completely dehydrated by subjecting the same to a temperature of over 400° F. at atmospheric pressure, as is described in my copending application and patent referred to, or by heating to a temperature approximately 50° F. less, in a vacuum. Suitable compositions for impregnating compounds are:—

Castor oil, 0 to 30 parts; phenyl phthalimid, 20 to 60 parts; Manila gum, 100 parts.

Phenol resin dehydrated and free of free phenol, 100 parts; phenyl phthalimid, 20 to 60 parts; mono-chloro-naphthaline or tetra-chloro-naphthalene, 20 to 50 parts.

Having now described my invention what I claim as new and desire to secure by Letters Patent is:—

1. An insulating composition comprising a fusible varnish gum and a solid, non-volatile-crystalloid of high melting point, the said composition having a setting or congealing point not lower than 240° F. and being thinly fluid when molten, substantially as described.

2. An insulating composition comprising approximately 100 parts of Manila gum and 20 to 70 parts of phenyl phthalimid, substantially as described.

3. An insulating composition which is slightly flexible when cold, has a congealing or setting point between 240° F. and 320° F., and is thinly fluid when molten, comprising a varnish gum, an oily substance, and a solid, non-volatile crystalline body, substantially as described.

4. An insulating composition comprising a fusible varnish gum, a crystalline body of high melting point and slight solubility in hydro-carbon oil and insoluble in water, and a substance for imparting flexibility to the composition when cold, substantially as described.

5. An insulating composition comprising substantially 100 parts of Manila gum, 20 to 70 parts of phenyl phthalimid, and from 10 to 30 parts of castor oil, substantially as described.

6. A new composition of matter comprising a non-conducting fusible gum which is proof against hydrocarbon oils used for lubricating purposes, and a crystalline body having a high melting point and slight solubility in hydro-carbon oil or water, substantially as described.

7. An insulating composition comprising a varnish gum and phenyl phthalimid, substantially as described.

8. A new composition of matter comprising a hydro-carbon-oil-proof gum, a crystalline body of high melting point and only slight solubility in hydro-carbon oil or water, and a non-hydro-carbon oil, substantially as described.

9. A new composition of matter, comprising a solidified solution intermixed with crystals, the ingredients of which composition comprise a fusible hydro-carbon-oil-proof gum, a crystalline body of high melting point and only slight solubility in hydro-carbon oil or water, and a non-hydro-carbon oil, substantially as described.

This specification signed and witnessed this 28th day of December 1911.

JONAS W. AYLSWORTH.

Witnesses:
  DYER SMITH,
  HENRY SHELDON.